United States Patent [19]

Niemann

[11] Patent Number: 4,995,467
[45] Date of Patent: Feb. 26, 1991

[54] METHOD AND APPARATUS FOR WEIGHING AND DISPENSING OBJECTS

[76] Inventor: Gary O. Niemann, 3204 E. Lake Hartridge Dr., Winter Haven, Fla. 33880

[21] Appl. No.: 363,931

[22] Filed: Jun. 9, 1989

[51] Int. Cl.$^5$ ............................................. G01G 13/16
[52] U.S. Cl. ....................................... 177/25.18; 177/1
[58] Field of Search ........................... 177/25.18, 70, 1

[56] References Cited

U.S. PATENT DOCUMENTS

| | | | |
|---|---|---|---|
| 3,708,025 | 1/1973 | Soler et al. | 177/70 X |
| 4,206,822 | 6/1980 | Mazzucchelli | 177/25.18 |
| 4,405,023 | 9/1983 | Guardiola | 177/145 X |
| 4,522,274 | 6/1985 | Konishi et al. | 177/25.18 |
| 4,549,617 | 10/1985 | Matsumoto et al. | 177/70 X |

*Primary Examiner*—George H. Miller, Jr.
*Attorney, Agent, or Firm*—Berman, Aisenberg & Platt

[57] ABSTRACT

A method and apparatus for selecting a combination of objects having an optimum weight as close as possible to a predetermined weight and greater than a minimum weight includes a plurality of lanes into which the objects are dispensed. The objects are counted as they are dispensed into the lanes such that several of the lanes have different numbers of objects. Each of the lanes is weighed, and the weights from the various lanes are combined in accordance with prescribed combinations to provide a plurality of weights. The plurality of weights are then compared with the minimum weight and with each other to determine the smallest weight above the minimum. The lanes having those objects are then opened such that the objects are dispensed into a bag.

The lanes are exposed from above to allow an operator to view the object and cull out undesired objects. Gates are provided between pre-lanes and lanes to effect the counting, and these gates extend from the bottom of the apparatus upward into the pre-lanes. Similarly, gates are provided at the ends of the lanes, and these gates extend upwardly from the bottom also.

15 Claims, 5 Drawing Sheets

METHOD AND APPARATUS FOR WEIGHING AND DISPENSING OBJECTS

TECHNICAL FIELD

The invention is a method and apparatus for providing a combination of objects having an optimum combined weight. In the preferred embodiment the apparatus is useful for grading and packing fruit.

BACKGROUND ART

In the packaging of fruit, it is necessary to provide a combination of fruit having a weight above a preselected minimum. For example, a 5-lb. bag of fruit may have a minimum desired weight of 5 lbs. 4 ounces, which will allow for shrinkage and yet exceed the minimum designated weight on the bag. Machines which are designed to grade fruit and dispense a combination of fruit close to the pre-determined weight are known.

U.S. Pat. No. 3,939,928 (Murakami) teaching a weighing system wherein a mechanism which is not specifically disclosed dispenses objects to a plurality of scales, and the weights derived from the scales are provided to an adder. An addition-code-selecting circuit selects combinations of the various weights to be added, and the absolute value of the difference between a combined weight and the desired weight is determined. This value is compared with that of all different combinations, the combination having the smallest absolute value is selected, and the combination producing that combined weight is dispensed. This system is not desirable because it is capable of producing a weight less than a predetermined weight, and if the bag must meet a minimum to comply with weight regulations, this machine could result in a violation.

A variety of other machines are known for weighing a plurality of groups of objects and for combining the groups in some fashion. These are generally either quite complicated or are unable to provide an optimum combination of groups of objects.

SUMMARY OF THE INVENTION

In accordance with the invention, an apparatus is provided for dividing incoming fruit among a plurality of lanes and for supplying each of these lanes with a preselected number of pieces of fruit. The group of objects in each lane is weighed, and the weights are supplied to a microprocessor which combines the weights in various predetermined permutations. Each of the combined weights is compared with a minimum acceptable weight, and the smallest weight which is above the minimum is selected. Then, the lanes which will produce that combined weight are dispensed, for example, to a bagger.

Fruit is counted into the individual lanes by using a plurality of pre-lanes, wherein each pre-lane is associated with respective lane. A pre-lane includes a gate and a pair of switches, the switches registering a count as each fruit passes, and the gate being activated to stop the flow of fruit into a lane after the preselected count has been achieved. Fruit is admitted to the pre-lanes by an inlet chute which includes a transversely-oscillating shuffle plate for causing fruit to flow evenly into the pre-lanes.

The lanes are generally channel-like and are open from above, the gates being actuated from below each of the lanes. This provides an unobstructed top of the apparatus and allows unobstructed viewing of the fruit. This unobstructed viewing permits the fruit to be graded and undesirable fruit culled from the pre-lanes by the operator.

While the preferred use of the apparatus is for providing a minimum weight, will be appreciated that the apparatus may also be used to provide a selected count of fruit by causing the electronic control of the apparatus to dispense fruit in the lanes in accordance with the count, as opposed to the weight.

It is an object of this invention to provide a unique machine for selecting a combination of objects having an optimum weight greater than a preselected weight.

Another object of this invention is to provide a unique method for determining a combination of objects having an optimum weight greater than a preselected weight.

DETAILED DESCRIPTION OF THE INVENTION

Figure 1:
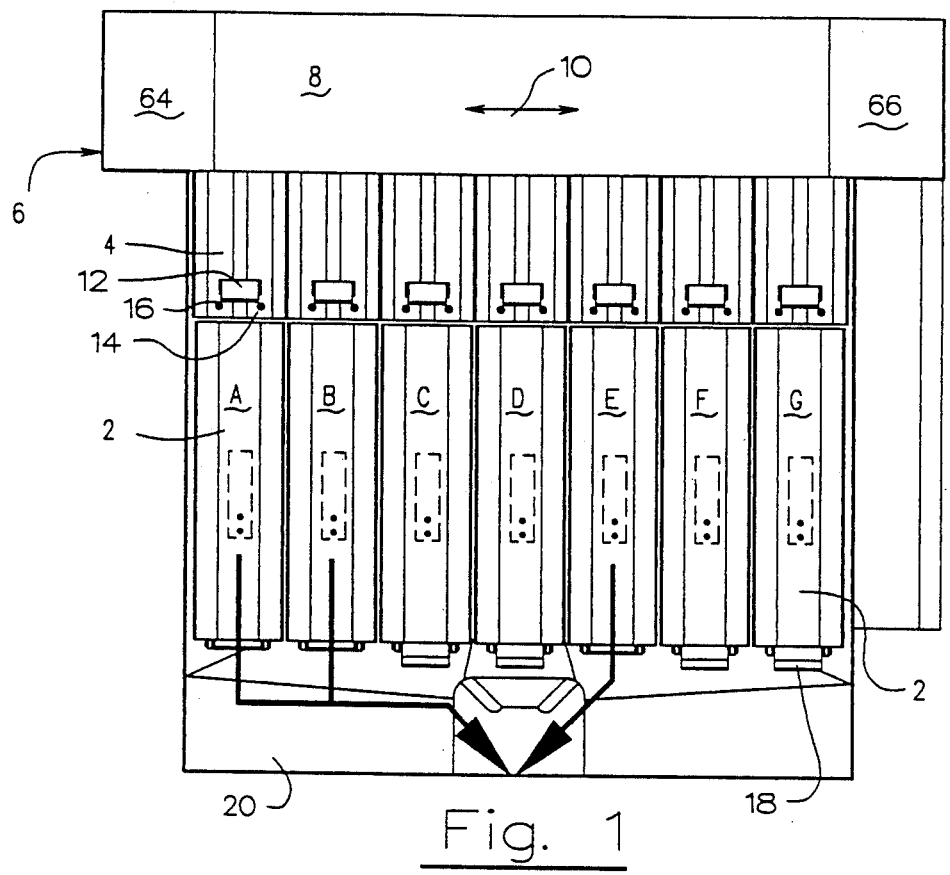
FIG. 1 is a plan view of apparatus in accordance with the invention showing a condition wherein three lanes are being discharged.

With reference to FIG. 1, an apparatus for weighing fruit comprises a plurality of lanes 2, each of which is designed to retain a number of pieces of fruit and to selectively allow discharge of the fruit. A plurality of pre-lanes 4 is arranged immediately adjacent to the set of lanes 2, and each pre-lane is associated with a respective lane.

An inlet chute 6 receives fruit from a source such as a conveyor (not shown), and the chute directs fruit onto a shuffle plate 8. The shuffle plate moves in the direction shown by arrow 10, which is transverse to the longitudinal axes of the pre-lanes 4 and the lanes 2. This motion of the shuffle plate causes the fruit to be dispensed evenly among the pre-lanes 4 and prevents the fruit from becoming caught between adjacent pre-lanes.

Each pre-lane has a gate 12 located at its lower end for controlling the passage of fruit from a pre-lane to a lane. Pre-lane 4 also includes switches 14 and 16 which detect passage of fruit, signals indicating the passage fruit being applied to the programmable controller shown in FIG. 7 as will be described more fully below for counting.

Lane 2 has a gate 18 at its lower end for selectively permitting discharge of the objects in a lane 2 into an outlet chute 20. Shown in FIG. 1, lanes A, B, and E are discharging fruit into outlet chute 20. (The lanes are designated A through G from left to right in FIG. 1.)

Figure 2:
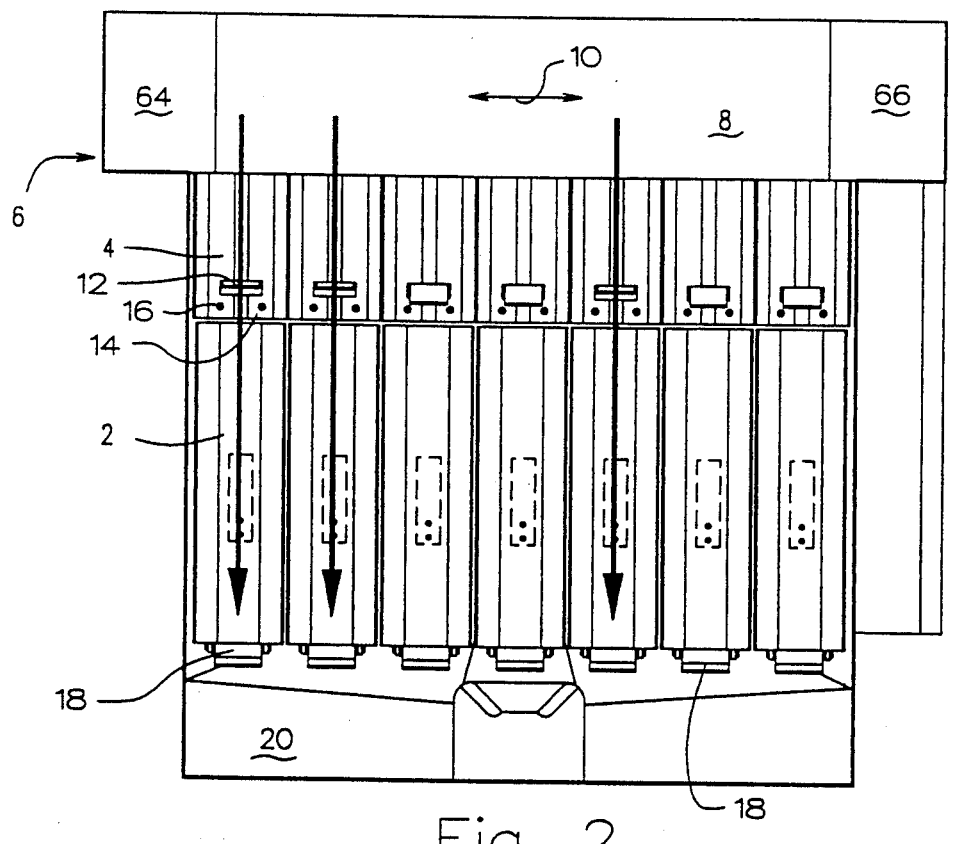
FIG. 2 is a plan view of an apparatus in accordance with the invention showing the refilling of three lanes through pre-lanes.

FIG. 2 illustrates a condition subsequent to that shown in FIG. 1, lanes A, B and E being recharged from pre lanes 4. As will be described more fully with respect to FIGS. 3 and 4, the gates 12 are closed in FIG. 1 while gates 18 for lanes A, B, and E are open. In FIG. 2, gates 12 for pre-lanes associated with lanes A, B, and E are open while all gates 18 are closed.

Figure 3:
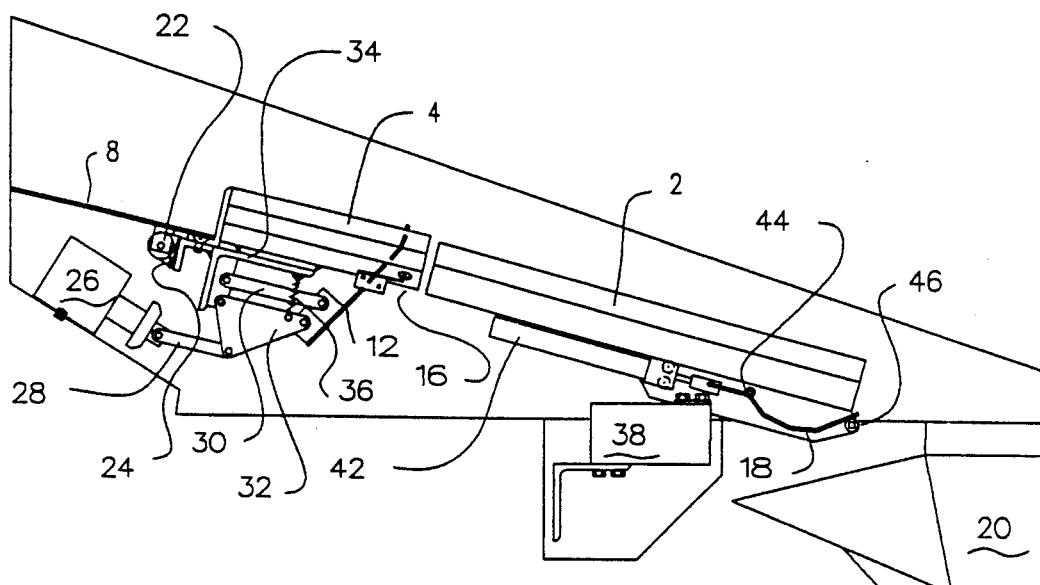
FIG. 3 is a side view of the apparatus shown in FIG. 1 wherein a side panel has been removed.

Referring now to FIG. 3, it will be appreciated that shuffle plate 8 is mounted to a pneumatic cylinder 22 which is in turn mounted to a bracket 24. Cylinder 22 is driven in oscillation whereby shuffle plate 8 is oscillated in the direction shown by arrow 10 in FIGS. 1 and 2. The shuffle plate is preferably a thin piece of metal. The pre-lanes 4 are V-shaped, and the lower portion of each lane includes a slot for a gate 12 to extend therethrough. A gate 12 is controlled by a solenoid 26, the solenoid being connected to the gate through linkages 28, 30, and 32. Linkage 32 is a triangular plate which provides a connection between a mounting bracket 34, linkage 28, and gate 12. Linkage 30 cooperates with linkage 32 to provide the proper orientation of gate 12. It will be appreciated that the combination of linkages 30 and 32 is not a parallelogram such that gate 12 is pulled upwardly slightly in the direction of the longitudinal axis of a lane as the gate moves downward. A spring 36 is connected between mounting bracket 34 and linkage 32 to pull the gate 12 upward into the position shown in FIG. 3 upon relaxation of the solenoid 26.

Lane 2, which may be V-shaped with a flat bottom, is mounted to a load cell 38 which is in turn mounted on a bracket 40. Load cell 38 is of a known construction and provides a signal indicating the weight of the load cell and the fruit in the cell. Because the weight of the lane itself is constant, the cell is easily calibrated to indicate the weight of the fruit in that lane. A pneumatic cylinder 42 lies along the bottom of lane 2 and controls the movement of a gate 18. Gate 18 comprises two parts hinged at 44, and a roller 46 engages the front of Gate 18 to cause the forward portion of the gate to pivot about hinge 44 as the gate is moved downward or upward by cylinder 42. Cylinder 42 is connected to a pneumatic line (not shown) and the air in the line is controlled by a solenoid activated valve (not shown).

Outlet chute 20 directs fruit to a bag (not shown) the bag being held by an adjustable support 48.

Figure 4:
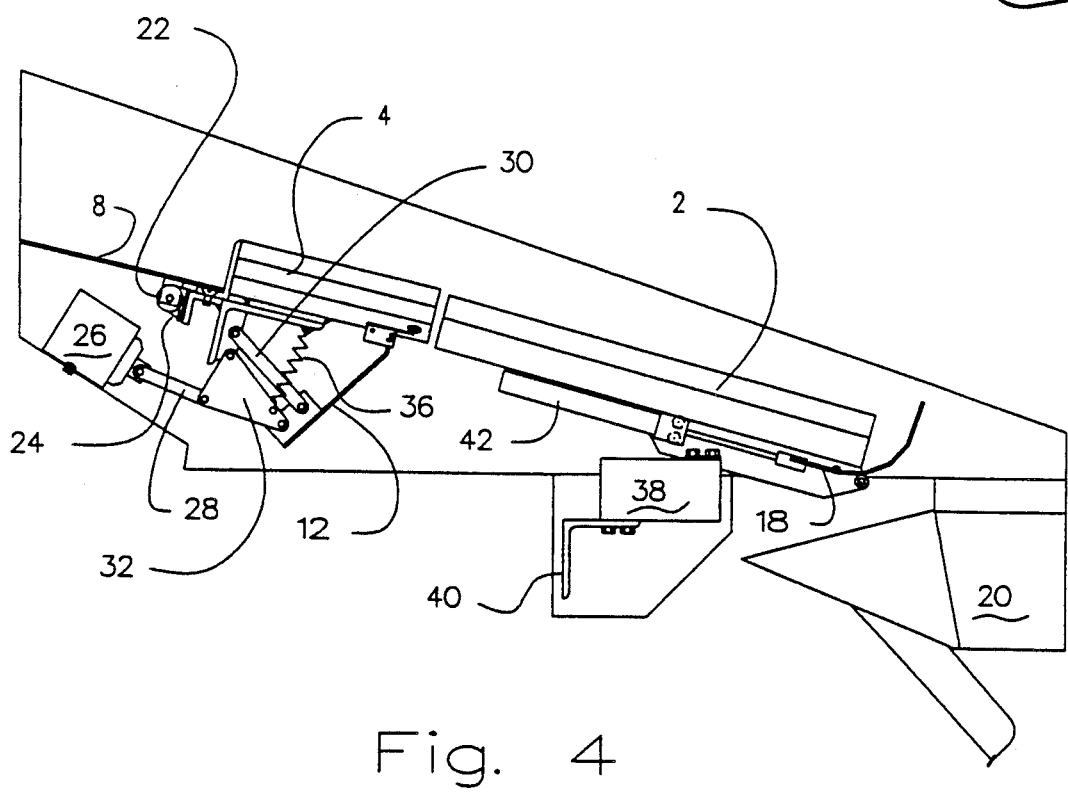
FIG. 4 is a side view of the apparatus of FIG. 2 wherein a side panel has been removed.

With reference to FIGS. 3 and 4, it will be appreciated that the upper tip of gate 12 moves along the lane as it is pulled to the position shown in FIG. 4 to move upwardly with respect to the pre-lanes as it returns to the position shown in FIG. 3 by action of spring 36. Solenoid 26 is deactivated by programmable controller (see FIG. 7) when the predetermined number of fruit has been discharged from pre-lane 4 into lane 2. Thus, switches 14 and 16 detect the passage of fruit, and gate 12 must stop the piece of fruit which has not yet contacted the switches 14 or 16. By causing the gate initially to move rapidly downstream as it rises with respect to the pre-lane in the closing movement, it is able to separate two pieces of fruit by getting in front of the upstream piece in pre-lane 4, thus providing for an accurate count of fruit which is passed from pre-lane 4 into lane 2. By initially moving downstream along pre-lane 4 when solenoid 26 is activated in the gate-opening motion, the tip of the gate moves away from the fruit and thus does not scrape the fruit, which could damage it.

Figure 5:
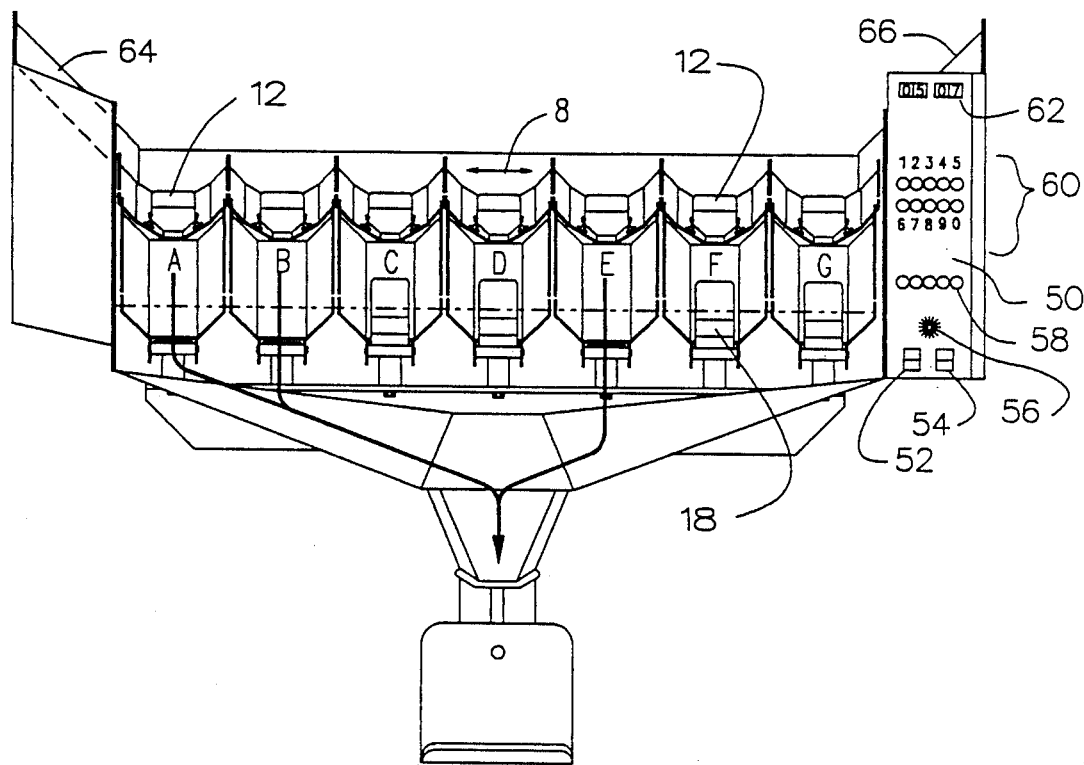
FIG. 5 is a front view of the apparatus shown in FIG. 1 wherein the front panel has been removed.
Figure 6:
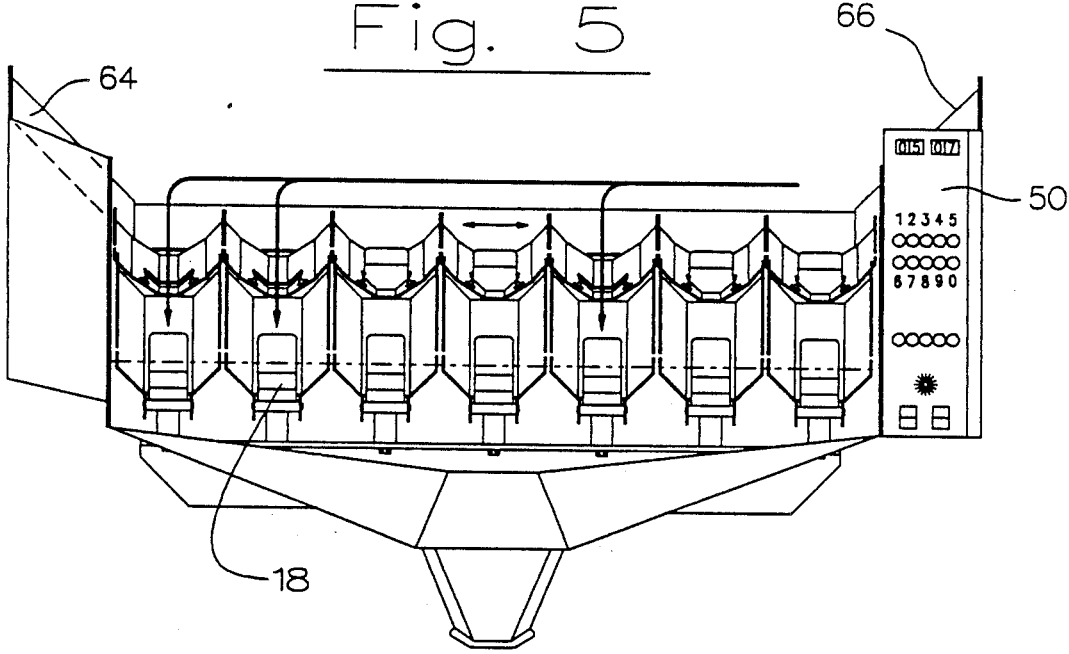
FIG. 6 is a front of the apparatus shown in FIG. 2 wherein the front panel has been removed.

With reference to FIGS. 5 and 6, a control panel 50 allows the operator to input information to programmable controller 68. For example, the operator can set the minimum bag weight and can select the expected number of fruit per bag. The programmable controller then admits a number of pieces of fruit to each lane in accordance with stored instructions for the expected number of fruit per bag. Switch 52 is a on/off switch for the entire machine. Switch 54 provides for either continuous or intermittent operation of the shuffle plate. Intermittent operation is provided by use of a magnetic reed switch operated by a magnet at each end of the stroke. When switch 54 is off, the shuffle plate oscillates as long as any upper gate 12 is open. This mode is useful for small, round fruit which recharge easily. For large, flat fruit which do not recharge readily, switch 54 is activated whereby the shuffle plate operates continuously. Switch 56 permits adjustment of the minimum weight in 1-ounce increments, buttons 58 allow the parameters to be supplied to a programmable controller (See FIG. 7), button 60 allows numerical information to be applied, and display 62 shows the bag size and expected count.

FIG. 5 shows two 45° plates 64 and 66 which are located on opposite sides of shuffle plate 8. Combination of these plates with the shuffle plate maintains the fruit in the proper location for flowing readily, by gravity, into pre-lanes 4.

As noted above, FIG. 5 illustrates the condition where fruit is being dispensed from lanes A, B, and E into the outlet chute. FIG. 6 illustrates the condition wherein all gates maintained are closed, and gates 12 for pre-lanes associated with lanes A, B, and E are open to reload those lanes. It will be appreciated that in the normal mode of operation the lanes are loaded by the number of pieces and are dispensed in accordance with the weight of the lane.

Figure 7:
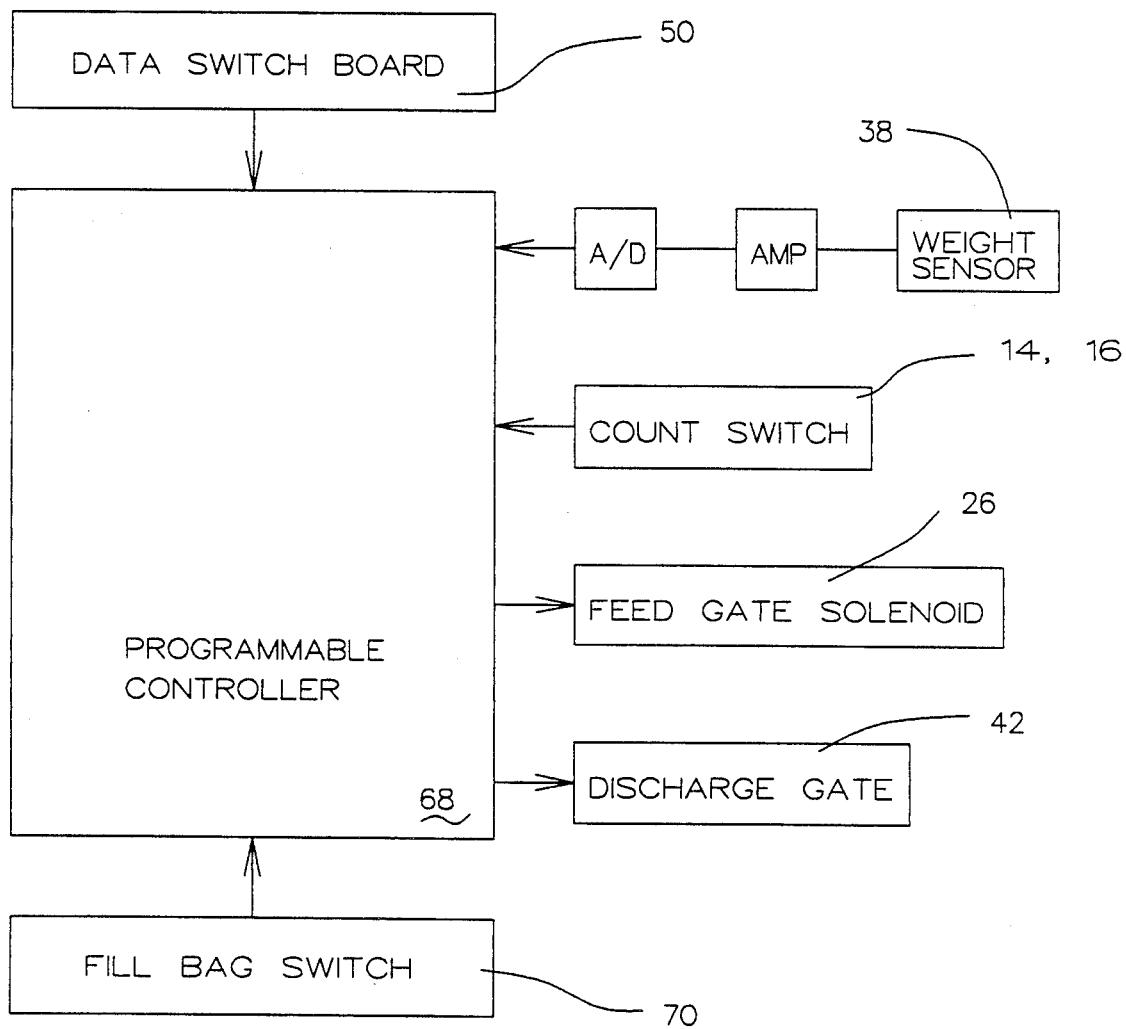
FIG. 7 is a block diagram of a circuit for control of the apparatus.

FIG. 7 is a block diagram showing a preferred electronic control system. Programmable controller 68 receives input from the data switch board 50, the load sensors 38, and the count switches 14 and 16. This data is used in accordance with the method disclosed in FIG. 8 to ascertain when the gate solenoid 26 should be activated and when a discharge should be activated. A fill bag switch 70 which is controlled by the operator is also connected to the programmable controller. Activation of switch 70 instructs the apparatus that a new bag is in place and to make the calculations and dispense the fruit.

Figure 8:
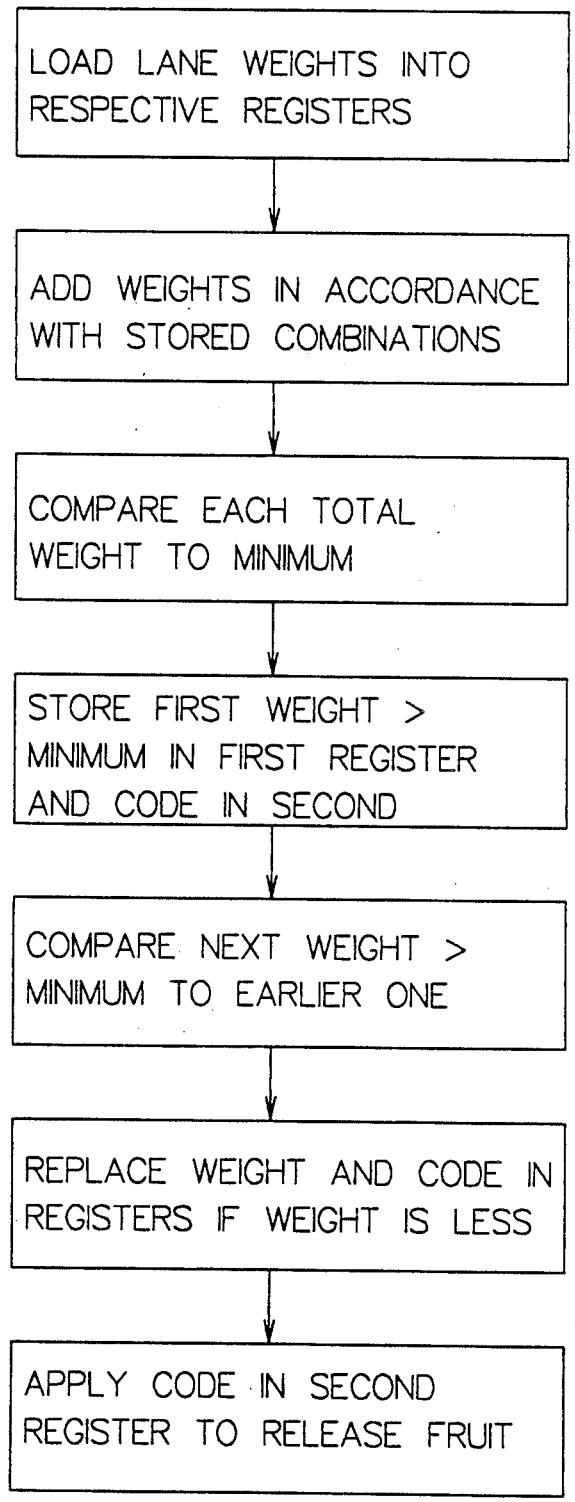
FIG. 8 is a flow chart of a program used to control the programmable controller shown in FIG. 7.

With reference to FIG. 8, the operation of the apparatus will be described. The programmable controller 68 determines the number of fruit to be added to each lane as a function of the desired weight and expected count of the combined set of objects, which have been supplied by the operator. The preferred embodiment is for use with fruit, which exhibit weight differences between pieces which makes it advantageous to provide different numbers of pieces of fruit in several of the lanes. For example, if the desired weight of the bag is 5 lb., it may be expected that seven pieces of fruit will be the average number. The controller would be directed to place one piece of fruit in each of the lanes A and B, two pieces of fruit in lanes C, D, E, and F, and three pieces of fruit in lane G. This distribution was selected empirically to provide a significant number of combinations of the lanes which will provide the expected number of pieces (e.g. seven) and that number plus or minus one and two pieces. In this example, there are four combinations of the lanes which will provide four pieces of fruit, 13 combinations which will provide five pieces, eighteen combinations which will provide six pieces, eighteen combinations which will provide seven pieces, thirteen combinations which will provide eight pieces and four combinations which will provide nine pieces. The weights as measured by the load cells 38 are supplied to the programmable controller 68, the controller being provided with the noted plurality of combinations of the lanes. The programmable controller adds the weights in accordance with these stored combinations to provide a plurality of combinations of the weights of the lanes. The first of these weights is then compared with the selected minimum weight, and the weight and code representing the selected lanes are stored in first and second registers, if the combined weight is greater than the predetermined minimum weight. Then, the next combined weight is compared with the minimum, and if it is larger than the minimum weight, it is compared with the earlier weight stored in first and second registers. If the second weight is less than the first weight, the values in the first and second registers are replaced with the smaller weight and the code representing the lanes which will produce that weight. This process is followed for all of the combinations stored in the programmable controller which results in the lowest possible weight which is larger than the minimum being stored in the registers after all of the comparisons have been made. Then, the code in the second register is applied to discharge gate control 42 to discharge those lanes into the outlet chute 20. After the discharge has been made, the feed gate solenoids are opened to re-load the lanes which were discharged.

The load cells are monitored by the controller such that the gates 18 are not closed and the process is not permitted to restart if fruit becomes lodged in a lane and does not dispense properly.

If the operator sees that a piece of fruit is bad he can remove that piece without harm to the overall process because the controller will dispense the lanes in accordance with the weight of the lane, not its count. The variation in the number of pieces admitted to each of the lanes is used to provide variability in the selecting the combination to provide the weight closest to the optimum.

In two stage operation, the apparatus dispenses all of the fruit in the lanes. Then it reloads and determines the optimum weight necessary to combine with that already dispensed to produce a determined weight. This would be used where the lanes of a single stage will not produce the minumum weight desired.

The count switches 14 and 16 may be connected in parallel or in series. Experience has shown that although a piece of fruit will open one of the switches slightly before opening the other switch, it is virtually impossible in normal operation for one of the switches to be opened and closed before the other switch is opened by the same piece of fruit. Thus, by arranging the switches on the sidewalls of the pre-lanes 4, it is virtually impossible for a piece of fruit to pass through the pre-lane and yet not be counted as a single piece of fruit.

Other methods of operation have been found to be useful also. If it is desired to load fruit into a carton by count only, the count for each layer of the carton can be loaded into the controller by the operator, or the count for the entire carton can be loaded and the controlled will determine the count for each layer. The apparatus will fill the center lanes with objects that add to that count and will supply the outer lanes with one or two pieces. When the operator activates switch 70, the center lanes will dispense the fruit to the carton. If the operator sees a bad piece, he may replace one in the carton with one from the outer lanes. The controller monitors the weight of the outer lanes and replaces the supply there when empty.

If it is desired to fill a bag with a predetermined count, the controller can be programmed to open upper and lower gates for a selected number of lanes. Then, after the selected number has passed, the gates are closed. For example, if one hundred pieces are desired, the center five lanes can be opened to allow ninety five fruit to pass. Then lane A closes after the next piece passes, lane B closes after the next piece passes, and so forth, thus obtaining the desired one hundred pieces.

Variations within the scope of the appended claims will be apparent to those with skill in the art.

I claim:

1. A method for selecting a combination of objects having an optimum weight greater than a preselected weight, comprising providing a plurality of groups of said objects wherein each of said groups comprises a predetermined number of said objects, weighing each of said groups, combining the weights from selected ones of the respective groups to produce a plurality of combined weights, comparing a first combined weight to said preselected weight, storing said first combined weight and a code representing the group having said first combined weight in a register if said first combined weight is greater than said preselected weight, comparing a second combined weight to said preselected weight, comparing said second combined weight to said first combined weight if said second combined weight is greater than said preselected weight, and replacing the values in said register with said second combined weight and a code representing the group having said second combined weight if said second combined weight is less than said first combined weight.

2. A method according to claim 1 wherein at least one of said groups has more of said objects than another of said groups.

3. A method according to claim 2 wherein said objects are fruit, and further comprising the step of dispensing said fruit in said group having said combined weight in accordance with said code in said register.

4. Apparatus for supplying a combination of objects having an optimum weight comprising a plurality of lanes, each of said lanes being for receiving a group of said objects, means for supplying each of said lanes with a predetermined number of said objects, means for weighing each of said groups of objects in each of said lanes, means for determining the combination of said groups having an optimum weight, and means for releasing said combination of groups for collection.

5. Apparatus according to claim 4 wherein said means for releasing said combination comprises a plurality of lane gates, each of said lane gates being associated with a respective one of said lanes.

6. Apparatus according to claim 5 wherein each of said lane gates comprises a curved element pivotally mounted to means for linear movement, wherein said curved element extends from the bottom of said lane to engage said objects when in a closed position, and said means for linear movement is mounted below said lane.

7. Apparatus according to claim 4 wherein said means for supplying each of said lanes comprises a plurality of pre-lanes, each of said pre-lanes being associated with a respective one of said lanes, each of said pre-lanes comprising means for directing said objects to a respective one of said lanes, pre-lane gate means for controlling the movement of said objects between said pre-lane and said lane, and counter means for counting the number of said objects passing from said pre-lane to said lane.

8. Apparatus according to claim 7 wherein said means for supplying further comprises a shuffle plate extending across said pre-lanes and mounted for oscillating movement in a direction transverse to the longitudinal axes of said pre-lanes.

9. Apparatus according to claim 8 wherein said means for supplying further comprises first and second plates at opposed sides of said shuffle plate, said plates being slanted with respect to a horizontal direction to direct objects onto said shuffle plate.

10. Apparatus according to claim 7 wherein said means for directing comprises a channel having first and second facing sidewalls and said counter means comprises detector means in each of said sidewalls for detecting the presence of a said object.

11. Apparatus according to claim 10 wherein said detector means comprises a first switch activated by passage of a said object in said first sidewall and a second switch activated by passage of a said object in said second sidewall.

12. Apparatus according to claim 10 wherein said pre-lane gate is mounted below said pre-lane, extends into said pre-lane from below said pre-lane, and is located upstream from said detector means.

13. Apparatus according to claim 12 wherein said pre-lane gate is pivotally mounted by linkage means such that an upper end of said pre-lane gate moves downstream as it releases said objects from said pre-lane to said lane.

14. Apparatus according to claim 13 further comprising solenoid means for activating said pre-lane gate.

15. A method for selecting a combination of objects having an optimum weight comprising admitting a respective predetermined number of said objects to each of a plurality of lanes, determining the total weight of the objects in each of said lanes, determining the combination of said weights which will provide said optimum weight, and dispensing said objects in the lanes which correspond to said combination of weights.

* * * * *